United States Patent [19]

Claessen

[11] Patent Number: 4,715,064
[45] Date of Patent: Dec. 22, 1987

[54] ADAPTIVE HYBRID CIRCUIT

[75] Inventor: Albertus M. G. Claessen, Montfoort, Netherlands

[73] Assignee: NCR Corporation, Dayton, Ohio

[21] Appl. No.: 623,302

[22] Filed: Jun. 22, 1984

[51] Int. Cl.[4] .................................................. H04B 3/03
[52] U.S. Cl. ..................................... 379/392; 370/32.1
[58] Field of Search ............. 179/170.2, 170.6, 170 R; 370/32, 32.1; 379/399, 402, 406, 410, 411, 387, 391, 392

[56] References Cited

U.S. PATENT DOCUMENTS

| | | | |
|---|---|---|---|
| 3,070,309 | 12/1962 | Fluegel | 73/861.16 |
| 3,810,182 | 5/1974 | White et al. | 343/180 |
| 3,973,089 | 8/1976 | Puckette | 379/404 |
| 4,087,654 | 5/1978 | Mueller | 379/411 |
| 4,370,741 | 1/1983 | Haass | 370/24 |
| 4,425,483 | 1/1984 | Lee et al. | 379/411 |
| 4,464,746 | 8/1984 | Snijders et al. | 370/32 |
| 4,535,206 | 8/1985 | Falconer | 370/32.1 |
| 4,578,544 | 3/1986 | Colin de Verdiere | 379/410 |
| 4,610,010 | 10/1986 | Claessen et al. | 370/32 |

FOREIGN PATENT DOCUMENTS

| | | |
|---|---|---|
| 1218007 | 6/1966 | Fed. Rep. of Germany . |
| 2485842 | 12/1981 | France . |
| 1492045 | 11/1977 | United Kingdom . |
| 2070394 | 9/1981 | United Kingdom . |

OTHER PUBLICATIONS

"Hybrid Circuit", H. Schimizu, Patent Abstracts of Japan, vol. 4, No. 63, 5-13-80, A55-31359.
"Echo Suppressor Using a Correlation Detector", L. E. West, IBM Technical Disclosure Bulletin, vol. 23, No. 8, Jan. 1981, pp. 3788-3790.

*Primary Examiner*—Jin F. Ng
*Assistant Examiner*—R. Vaas
*Attorney, Agent, or Firm*—Albert L. Sessler, Jr.

[57] ABSTRACT

An adaptive hybrid circuit is disclosed for adaptively cancelling a crosstalk component from a transmitter to a receiver in a local station of a local area network. In a preferred embodiment the adaptive hybrid circuit is coupled to a common two-wire transmission line in the network and also between the transmitter and the receiver of the local station. The adaptive hybrid circuit is comprised of a comparator, an integrator and an adjustment circuit. An output signal from the receiver is compared in the comparator with a transmit signal to develop a first signal which causes the integrator to develop a second signal having an amplitude which varies as a function of the states of the first signal. The second signal from the integrator, a transmitter signal, and a composite signal from the transmission line containing a crosstalk component from the transmitter and a received signal component transmitted from a remote station are applied to the adjustment circuit. In the adjustment circuit the transmitter signal is multiplied by the second signal to develop an estimate of the crosstalk component which estimate varies automatically to cancel the crosstalk component in the composite signal for any given transmission line impedance. When the crosstalk component is cancelled, the output of the adjustment circuit only contains the received signal which is detected by the receiver.

15 Claims, 7 Drawing Figures

ADAPTIVE HYBRID CIRCUIT

BACKGROUND OF THE INVENTION

1. Field of the Invention

The present invention relates to an adaptive hybrid circuit for minimizing crosstalk from a transmitter to a receiver in the same station when the transmitter and receiver are coupled to a two-wire transmission line or communication channel, such as a coaxial or twisted pair cable, of a local area network comprised of a plurality of transmitter/receiver stations coupled to the same two-wire communication channel.

2. Description of the Prior Art

In the transmitter/receiver circuitry of a bus-type local area network based on CSMA/CD (carrier sense multiple access with collision detection), a hybrid circuit can be used for the separation or isolation of simultaneously transmitted and received signals at one of the stations in the network. This separation allows the implementation of collision detection at larger transmit to receive level ratios than without a hybrid. Thus, larger transmission distances can be achieved by using a hybrid. However, a hybrid must be designed for a fixed nominal transmission line impedance. This means that the maximum attenuation of the transmitted signal crosstalk into the received signal is obtained for only one transmission line impedance. In addition, the crosstalk attenuation for a given transmission line impedance will depend on the tolerances of the components that comprise the hybrid. Thus, any change in the impedance of the transmission line or in the values of the components in the hybrid, such as due to a temperature change, can prevent the hybrid from optimally cancelling the transmitted signal crosstalk from the received signal.

Adaptive hybrid circuits have been proposed in U.S. Pat. No. 3,810,182 and in British patent specification No. 1,492,045 for cancelling the crosstalk from a transmitter to a receiver at the same station.

U.S. Pat. No. 3,810,182 has an adaptive hybrid circuit interposed between the transmitter and the receiver at one end of the transmission channel and correlates signals in the transmission channel with signals from the transmitter to adjust both the gain and phase shift of the signal from the transmitter until the signal component in the transmission channel from the transmitter is filtered from the transmission channel signal so that only the receiver signal component is passed into the receiver.

British patent specification No. 1,492,045 discloses an audio frequency adaptive hybrid circuit for use in telephone circuits wherein a 4 wire transmit port, a 4 wire receive port and a 2 wire channel port are isolated from one another by transformers. An impedance synthesis network, comprising a tapped delay line network, and a correlation control loop for controlling adjustable tap weights in the tapped delay line network are utilized to cancel the crosstalk.

SUMMARY OF THE INVENTION

According to the present invention, there is provided a system and method for minimizing the crosstalk from a transmitter to a receiver by adaptively forcing to zero the correlation between the output of the transmitter and the output of an adaptive hybrid circuit coupled between the transmitter and receiver.

In a preferred embodiment of the invention an adaptive hybrid circuit is coupled between a transmitter and a receiver. The adaptive hybrid circuit is comprised of a comparator, an integrator and an adjustment circuit. The output from the receiver is compared in the comparator with a transmit signal to develop a first signal which causes the integrator to develop a second signal having an amplitude which varies as a function of the state of the first signal. The transmitted signal, the second signal and a composite signal comprised of the received signal and a crosstalk signal from the transmitter are applied to the adjustment circuit. In the adjustment circuit, the transmitted signal is multiplied by the second signal to develop a crosstalk cancelling signal which varies automatically to cancel the crosstalk signal in the composite signal for any given transmission line impedance. When the crosstalk is cancelled, the output of the adjustment circuit only contains the received signal which is detected by the receiver.

It is, therefore, an object of this invention to provide an improved adaptive hybrid circuit and method for minimizing the crosstalk from a transmitter to a receiver.

Another object of this invention is to provide a simple, improved adaptive hybrid circuit which is particularly adapted for use in each of a plurality of stations connected to a two-wire transmission line in a local area network.

Another object of this invention is to provide an improved crosstalk component cancellation circuit for a transmit/receive station coupled to a common transmission line in a local area network.

A further object of this invention is to provide an improved adaptive hybrid circuit, and method therefor, for adaptively cancelling crosstalk from a transmission channel.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein.

DESCRIPTION OF THE PREFERRED EMBODIMENT

Although the invention will be described in relation to its application in a local area network employing a serial bus, it should be realized that its application should not be restricted to such utilization.

Figure 1:
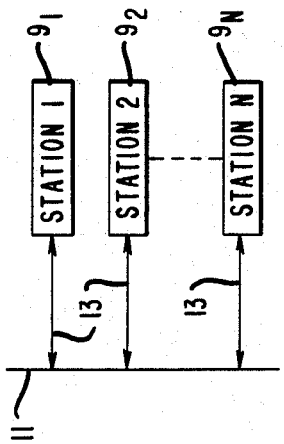
FIG. 1 is a schematic block diagram of a plurality of communications stations individually coupled to a common transmission medium to form a local area network.

Referring now to FIG. 1, there is shown a communications network including a plurality of stations $9_1, 9_2 \ldots 9_N$ connected to a serial data bus or transmission line 11 preferably embodied as a coaxial cable. Each of these stations $9_1, 9_2 \ldots 9_N$ is connected to the transmission line 11 by an associated two-wire connection or tap 13 for transmitting data into the transmission line 11 as well as receiving data from the transmission line 11. The communications network forms a local area network (LAN) utilizing the well-known CSMA/CD (carrier sense multiple access with collision detection) protocol. Briefly, if a station detects no activity on the transmission line 11, then the station may start transmitting. If two stations start transmitting simultaneously or substantially simultaneously, then a "collision" occurs. This collision is detected by both stations and they will both abort transmission and re-try transmission after a random time period.

Figure 2:
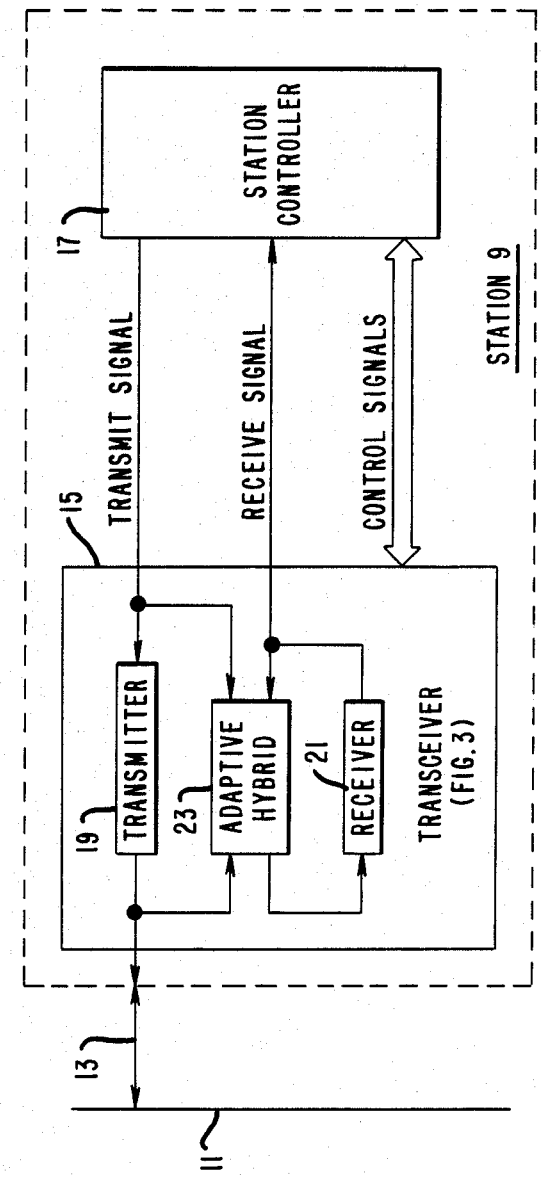
FIG. 2 is a schematic block diagram of a typical station in the local area network.

Referring to FIG. 2, there is shown a block diagram of a typical station 9. The station 9 includes a transceiver 15 which is coupled to a station controller 17. The transceiver 15 includes a transmitter 19, a receiver 21 and an adaptive hybrid circuit 23.

In operation, a "transmit signal" comprised of data to be transmitted is applied from the controller 17 to the transmitter 19 for signal processing and transmission onto the transmission line 11 by way of the associated tap 13. Signals received from the transmission line 11 are applied via the tap 13 and adaptive hybrid 23 to the receiver 21 for detection. A detected "receive signal" is applied from the receiver 21 to the controller 17 for subsequent utilization by the controller 17. Bidirectional control signals are selectively utilized by the transceiver 15 and station controller 17 for proper timing and control operations. As will be explained later, the adaptive hybrid 23 minimizes the crosstalk from the transmitter 19 to the receiver 21 so that a signal on the transmission line 11 from a remote station can be detected while the station 9 is transmitting. A detailed description of the station controller 17 is unnecessary for an understanding of the present invention.

Figure 3:
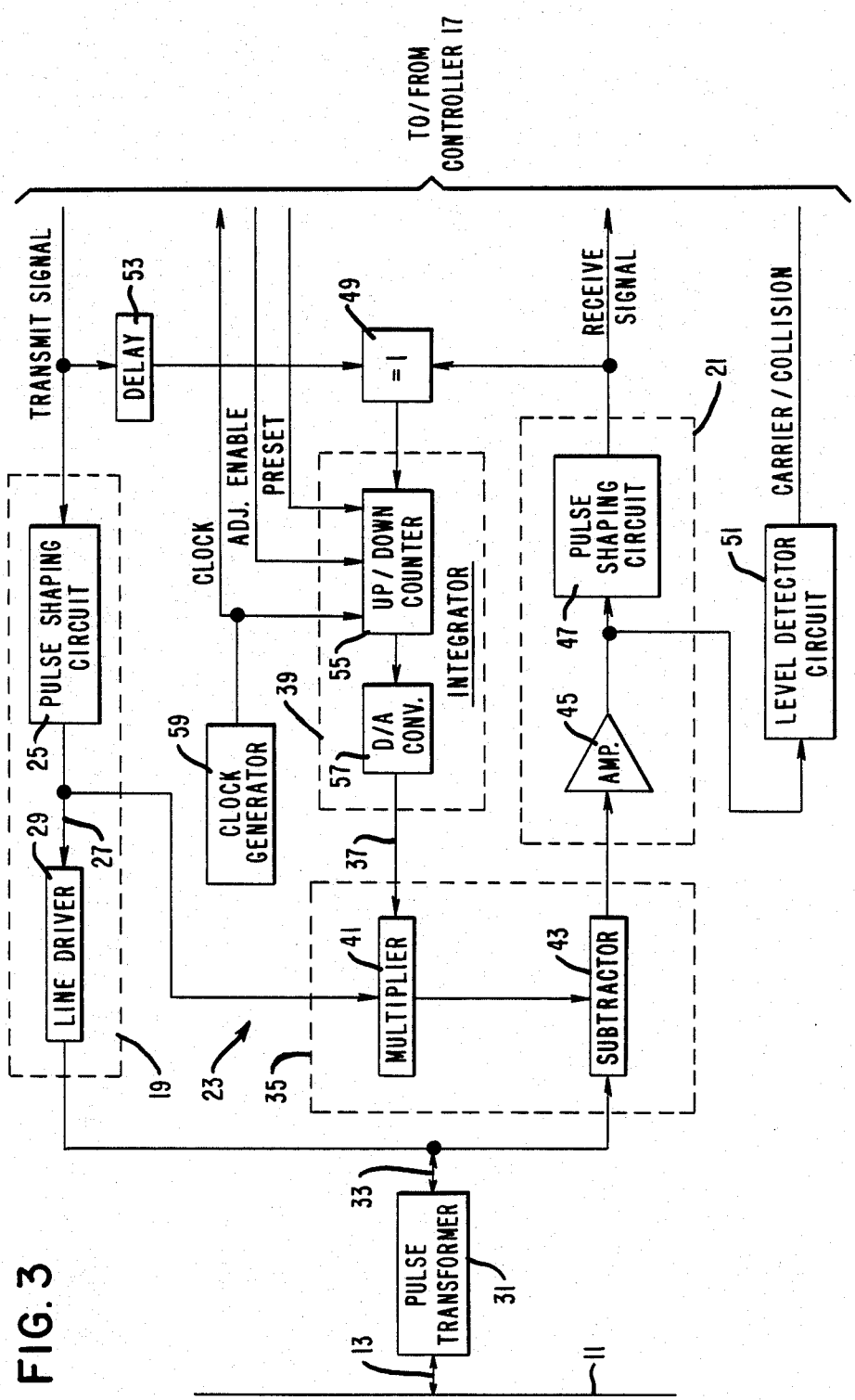
FIG. 3 is a schematic block diagram of a transceiver in the station of FIG. 2, which transceiver includes a transmitter, a receiver and an adaptive hybrid circuit coupled between the transmitter and receiver.

Referring now to FIG. 3, there is shown a block diagram of the transceiver 15. A transmit signal comprised of Manchester coded data to be transmitted is supplied at a rate of one megabit (1 Mbit) per second from the controller 17 (FIG. 2) to a pulse shaping circuit 25. The pulse shaping circuit 25 smooths the sharp transitions in the Manchester coded transmit signal to suppress harmonics in that transmit signal. In addition, the pulse shaping circuit 25 also provides pre-emphasis to the transmit signal to compensate for part of the subsequent distortion of that transmit signal which is introduced by the transmission line 11. In an exemplary implementation the pulse shaping circuit 25 can include a shift register, a buffer, a resistor ladder network and an analog filter. However, it should be understood that the pulse shaping circuit 25 can be implemented differently and since the details of the pulse shaping circuit 25 are not essential to an understanding of the present invention, the pulse shaping circuit 25 will not be further described.

The output of the pulse shaping circuit 25 is applied via a line 27 to a line driver 29, which together with the pulse shaping circuit 25 may comprise the transmitter 19. The line driver 29 includes two transistors 71 and 73 (FIG. 4) which are used as current sources and are driven in antiphase (180 degrees out of phase with each other), as will be explained later.

The transmitter 19, as well as the receiver 21 (via the adaptive hybrid 23), are coupled to the transmission line 11 via tap 13 by means of a pulse transformer 31. The transformer 31 provides the common mode rejection for the receiver 21 and the ground isolation to avoid current (A.C. mains) problems.

In operation, the output of the line driver 29 is applied by way of a line 33 to drive the pulse transformer 31. When so driven, the pulse transformer 31 feeds the output transmit signal from the transmitter 19 onto the transmission line 11 via the associated tap 13. However, in certain environments the pulse transformer 31 may be omitted.

As indicated in FIG. 3, any signal transmitted onto the transmission line 11 from a remote station is received from the transmission line 11 via the tap 13 and transformer 31. As a result, the line 33 can carry a composite signal formed by the output signal from the line driver 29 together with any signal which may be received from the transmission line 11 via the tap 13 and pulse transformer 31.

The line 27 from the output of the pulse shaping circuit 25, line 33 from the output of the line driver 29 and a line 37 from the output of an integrator 39 are all connected to an adjustment circuit 35. In the embodiment of the adjustment circuit 35 that is shown in FIG. 3, the adjustment circuit 35 includes a multiplier 41 and a combiner or subtractor 43. A pulse shaped transmit signal on the line 27 and the signal on the line 37 are multiplied together in the multiplier 41 to adaptively develop a product signal which is an estimate of the crosstalk (from the transmitter 19) that may be contained in the composite signal on the line 33. As will be explained later in more detail, this crosstalk estimate is subtracted in the subtractor 43 from a composite signal on the line 33 to cancel out the crosstalk (from the transmitter 19) that may be contained in that composite signal. The difference signal at the output of the subtractor 43 is the output of the adjustment circuit 35. Thus, only a received signal from the transmission line is adaptively developed at the output of the adjustment circuit 35.

Figure 4:
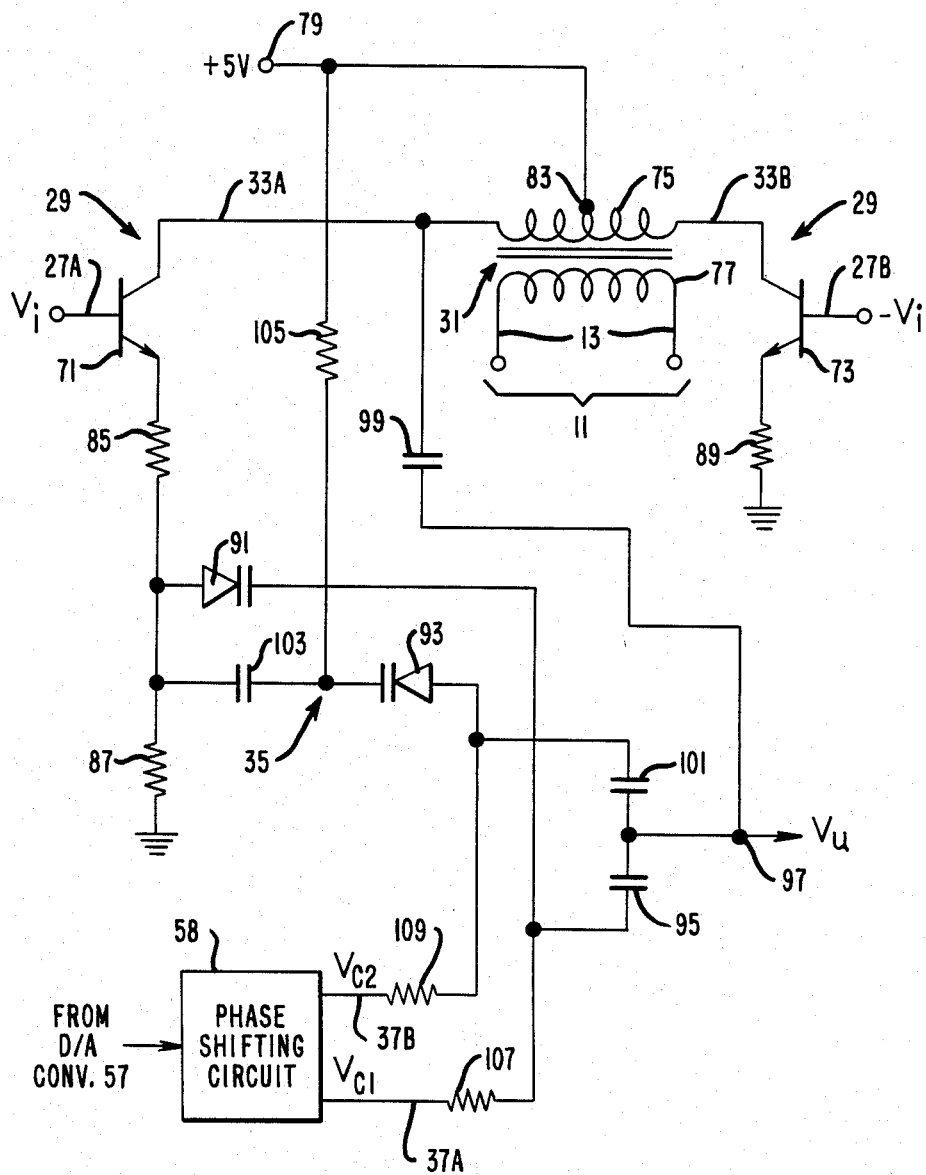
FIG. 4 is a schematic diagram of the line driver 29, pulse transformer 31, an additional part of the integrator 39 and a preferred embodiment of the adjustment circuit 35 of FIG. 3.

In the embodiment of the invention (as shown in FIG. 3), the adjustment circuit 35 includes a physically separate standard multiplier circuit 41 and a standard adder/subtractor or combiner circuit 43 functioning as a subtractor. However, in the preferred embodiment of the invention, the adjustment circuit 35 (as shown in FIG. 4) does not include a physically separate multiplier and subtractor.

The output of the adjustment circuit 35 is applied to the receiver 21 which comprises an amplifier 45 and a pulse shaping circuit 47. The amplifier 45 has a high input impedance to minimize the loading of the transmission line 11. In addition, the amplifier 45 preferably includes filter characteristics to compensate for part of the distortion of the received signal that is generated by the transmission line 11. The design of such an amplifier 45 is well-known by those skilled in the art and, therefore, no further description of the amplifier 45 is needed.

The output of the amplifier 45 is applied to the pulse shaping circuit 47 which may include a standard high speed comparator to digitize the output of the amplifier 45 to develop a digital "receive signal". This receive signal, which is the output of the receiver 21, is applied to digital circuits (not shown) in the station controller 17 (FIG. 2) for subsequent processing and also applied to an EXCLUSIVE-OR (EX-OR) gate 49 (to be discussed).

The output of the amplifier 45 is also applied to a level detector circuit 51. This level detector circuit 51 is implemented to develop a carrier/collision signal when it detects the presence of any signal above a predetermined threshold level. Such a carrier/collision signal indicates the detection of a transmission from a remote station on the transmission line 11. This carrier/collision signal is applied to the station controller 17. Since the controller 17 knows when it is transmitting a transmit signal, it interprets the carrier/collision signal as the detection of a collision when it is transmitting the transmit signal and as the detection of carrier when it is not transmitting the transmit signal.

As stated before the digital receive signal output of the pulse shaping circuit 47 is applied to an EXCLUSIVE-OR (EX-OR) gate 49. The digital transmit signal from the controller 17 is also applied to the gate 49 via a delay 53. Delay 53 compensates for circuit delays in the adaptive hybrid circuit 23 and receiver 21. The EXCLUSIVE-OR gate 49 functions as a digital comparator by comparing its input digital transmit and receive signals with each other. When the transmit and receive signals have the same logical states, the gate 49 develops a 0 state output. Similarly, when the transmit and receive signals have different logical states, the gate 49 develops a 1 state output.

The output of the EXCLUSIVE-OR gate 49 is applied to the integrator 39. The EXCLUSIVE-OR gate 49, integrator 39 and adjustment circuit 35 essentially comprise the adaptive hybrid circuit 23 of FIG. 2. The adaptive hybrid 23 and receiver 21 form a loop for adaptively cancelling out any transmitter crosstalk from the output of the adjustment circuit 35 (input to the receiver 21).

The integrator 39 includes a digital up/down counter 55 and a digital-to-analog converter (D/A CONV.) 57. The counter 55 is initially preset to a predetermined count by a preset signal from the controller 17. Clock pulses from a clock generator 59 are applied to the controller 17 to control the transmit clock rate of the transmit signal and are also applied to the count input of the counter 55. During any period of time that the controller 17 generates a transmit signal, the controller 17 also applies an adjust enable signal to the counter 55 to enable the counter 55 to count clock pulses during that transmission. When enabled by the adjust enable signal, the up/down counter 55 counts up or down as a function of the logical state of the up/down signal from the EXCLUSIVE-OR gate 49. For example, when the transmit and receive signals to the gate 49 have the same logical states, the 0 state output of the gate 49 forces the counter 55 to count clock pulses by decrementing its count. Conversely, when the transmit and receive signals to the gate 49 have different logical states, the 1 state output of the gate 49 forces the counter 55 to count clock pulses by incrementing its count. Outputs from the stages (not shown) of the counter 55 are applied to the digital-to-analog converter 57 which may be formed by a resistor ladder network (not shown). The digital-to-analog converter 57 converts the digital count from the counter 55 to an analog signal which is representative of the digital count in the counter 55.

It will be appreciated that an advantage of utilizing a digital counter 55 in the integrator 39 is that the count of the counter 55 does not change between transmissions.

The analog signal from the converter 57 is applied over line 37 to the adjustment circuit 35. The signal on the line 37 operates as a multiplication factor for the pulse shaped transmit signal on line 27 to enable the multiplier 41 to develop the crosstalk estimate which, as stated before, is subtracted in the subtractor 43 from the composite signal on line 33 to adaptively develop a residual received signal. However, as stated before, in the preferred embodiment of the adjustment circuit 35 (FIG. 4) the multiplier 41 and subtractor 43 are effectively combined.

Although not essential to an understanding of the present invention, it is deemed helpful to provide a brief description of the underlying theory. For ease of understanding, this theory will be presented in the form of an algorithm described on a signal sample basis, although the actual implementation in the circuit shown in FIG. 3 is in the form of continuous signals on the lines 27, 37 and 33 and at the output of the subtractor 43.

Thus, the composite signal on the line 33, which is regarded as being sampled at the symbol rate, can be represented as:

$$S_k = \sum_{i=-\infty}^{+\infty} b_{k-i} \cdot g_i + \sum_{i=-\infty}^{+\infty} a_{k-i} \cdot r_i + n_k$$

where
$S_k$ = composite signal on line 33
$b_k$ = received data symbols on line 33
$a_k$ = transmitted data symbols on line 33, $E\{a_k^2\}=1$
$g_k$ = intersymbol interference from line 11
$r_k$ = echo path impulse response
$r_0$ = bridge crosstalk
$n_k$ = noise samples, mean 0, variance $\sigma^2$ Subtracting the crosstalk estimate from multiplier 41 from the composite signal on line 33 results in an error signal $e_k$ at the output of the subtractor 43, where $$e_k = \sum_{i=-\infty}^{+\infty} b_{k-i} \cdot g_i + \sum_{i=-\infty}^{+\infty} a_{k-i} \cdot r_i - a_k \cdot c_0 + n_k$$

where
$a_k$ = transmitted data symbols on line 27
$c_0$ = multiplication factor on line 37.

It is clear that the choice $c_0 = r_0$ completely cancels the crosstalk and therefore is the optimum choice.

Introducing the error $\phi_0 = r_0 - c_0$, one can write the mean square error as:

$$\epsilon = E\{e_k^2\} = \phi_0^2 + R$$

where E represents the expected value or mathematical expectation.

Assuming mutually uncorrelated data symbols, the uncancellable mean square error is:

$$R = \sum_{i=-\infty}^{+\infty} g_i^2 + \sum_{\substack{i=-\infty \\ i \neq 0}}^{+\infty} r_i^2 + \sigma^2$$

where R is composed of intersymbol interference, echoes and channel noise.

A stochastic gradient algorithm can be used for adaptive adjustment of $c_0$.

The gradient of the mean-square error is given by:

$$\frac{\delta \epsilon}{\delta c_0} = -2E\{e_k \cdot a_k\} = -2\phi_0$$

Adjustments are most conveniently made by using averaged estimates according to the recursion:

$$c_{0k+1} = c_{0k} + \gamma \cdot a_k \cdot e_k$$

where $\gamma$ = constant.

While the above algorithm was described on a sampled basis, it should be readily apparent to those skilled in the art that it can be implemented with the analog circuitry shown in FIG. 3.

Referring now to FIG. 4, there is shown a schematic circuit diagram of the line driver 29, pulse transformer 31 and the preferred embodiment of the adjustment circuit 35.

In utilizing a preferred embodiment of the adjustment circuit 35, several modifications have to be made in the pulse shaping circuit 25, integrator 39 and lines 27, 33 and 37 that are shown in FIG. 3 and involved in the structure and operation of the circuit of FIG. 4. The modified pulse shaping circuit 25 can now include a shift register, a buffer, a resistor ladder network, an analog filter and a phase shifting circuit (not shown) to develop two analog phase-shaped, transmit signals (shown in FIG. 4 as $V_i$ and $-V_i$) that are 180 degrees out of phase with each other. The line 27 in FIG. 3 is split into two physical lines shown in FIG. 4 as 27A and 27B. These lines 27A and 27B are respectively driven in antiphase by the outputs $V_i$ and $-V_i$ of the modified circuit 25. The modified integrator 39 further includes a phase shifting circuit 58 coupled to the output of the digital-to-analog converter 57 for developing two analog control signals (shown in FIG. 4 as $V_{C1}$ and $V_{C2}$) that are 180 degrees out of phase with each other. The line 37 in FIG. 3 is split into two physical lines shown in FIG. 4 as 37A and 37B. Finally, the line 33 in FIG. 3 is also split into two physical lines shown in FIG. 4 as 33A and 33B.

The signal $V_i$ on line 27A and the signal $-V_i$ on line 27B are respectively applied to the bases of NPN medium power transistors 71 and 73 whose collectors are respectively coupled via lines 33A and 33B to opposite ends of a winding 75 of the pulse transformer 31. The other winding 77 of the pulse transformer 31 is coupled via an associated tap 13 to the transmission line 11. The emitter of transistor 71 is coupled through serially-connected resistors 85 and 87 to ground, while the emitter of transistor 73 is coupled through resistor 89 to ground. Power for the transistors 71 and 73 is supplied from a +5 volt source 79 to a center tap 83 of the winding 75.

The preferred adjustment circuit 35 includes a pair of oppositely poled varactors or varactor diodes 91 and 93. Varactor 91 has its anode connected to the junction of resistors 85 and 87 and its cathode coupled via a capacitor 95 to an output terminal 97. A capacitor 99 is connected between the line 33A and the output terminal 97. In a similar manner, varactor 93 has its anode coupled via a capacitor 101 to the output terminal 97 and its cathode coupled via a capacitor 103 to the junction of resistors 85 and 87. A resistor 105 is connected between the +5 volt source 79 and the junction of the varactor 93 and capacitor 103.

The control signals $V_{c1}$ and $V_{c2}$ from the previously discussed, modified version of integrator 39 are respectively applied over lines 37A and 37B to the preferred adjustment circuit 35 shown in FIG. 4. It will be recalled that the control signals $V_{c1}$ and $V_{c2}$ are 180 degrees out of phase with each other. Control signal $V_{c1}$ is applied from line 37A through a resistor 107 to the cathode of varactor 91 to control the capacitance of varactor 91. Similarly, control signal $V_{c2}$ is applied from line 37B through a resistor 109 to the anode of varactor 93 to control the capacitance of varactor 93. The output signal from the adjustment circuit 35 of FIG. 4 is provided at the output terminal 97 and is designated as $V_u$.

Figure 5A:
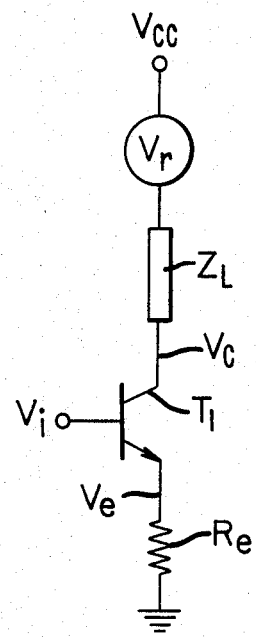
FIGS. 5A, 5B and 5C are simplified circuits useful for explaining the operation of the preferred embodiment of the adjustment circuit 35 of FIG. 4.
Figure 5B:
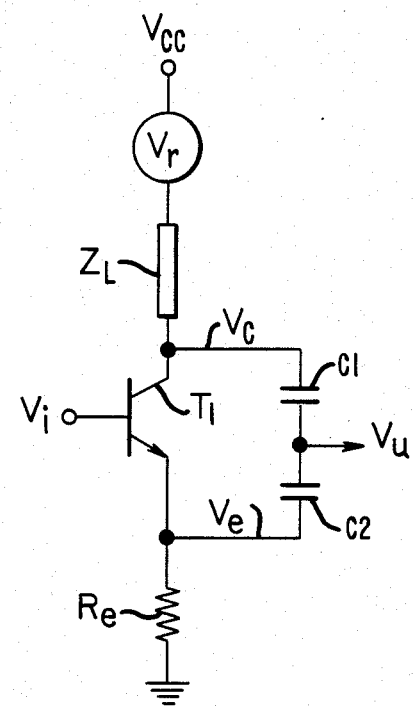
Figure 5C:
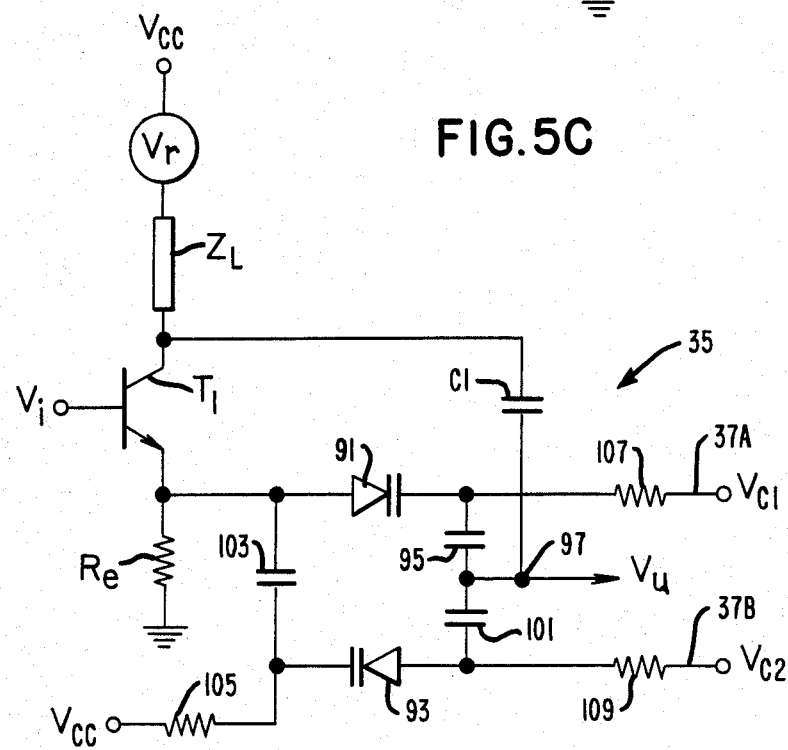

Referring to FIGS. 5A, 5B and 5C, the operation of the adjustment circuit 35 will now be explained. In each of the FIGS. 5A, 5B and 5C, $V_{cc}$ represents the D.C. voltage of a power supply (not shown), $Z_L$ represents the impedance of the transmission line 11, a voltage source $V_r$ connected in series between $V_{cc}$ and $Z_L$ represents a voltage transmitted from a remote station and induced into the winding 77 of the pulse transformer 13 (FIG. 4), T1 represents the transistor 71 (FIG. 4) and Re represents the resistors 85 and 87 (FIG. 4). Furthermore, it should be noted that in the analysis of the operation of each of the circuits of FIGS. 5A, 5B and 5C only A.C. voltages will be considered.

FIG. 5A is a simplified representation of that portion of FIG. 4 which includes the transmission line 11 and the pulse transformer 31 being driven by the two medium power transistors 71 and 73. For ease of understanding, FIG. 5A will now be discussed in transmit, receive and collision modes of operation.

TRANSMIT ONLY OPERATED

When the station 9 is transmitting, the line driver 29 (FIGS. 3 and 4) operates as a normal transistor amplifier T1 of which the emitter impedance is equal to $R_e$ and the collector impedance is equal to $Z_L$, the line impedance. The voltage generated on the collector of transistor $T_1$ thus is $$-\left(\frac{Z_L + jwL_L}{Re}\right) \cdot V_i \qquad (1)$$

where:
 $V_i$ = the pulse shaped transmit signal from pulse shaping circuit 25
 $L_L$ = the leakage inductance of pulse transformer 31
 $w = \omega = 2\pi f$
 j = a 90 degree phase shift in the inductive reactance ($wL_L$)

For an analysis of the operation of the circuit of FIG. 5A, the leakage inductance of the pulse transformer 31 may be neglected. In this case the collector voltage is $$\frac{-Z_L}{Re} \cdot V_i \qquad (2)$$

The impedance at the collector of $T_1$ will now be further analyzed. Because the associated tap 13 (FIG. 3) is connected to a point somewhere on the transmission line 11 (FIG. 3) and is not the end of the transmission line 11, the impedance with which the transceiver 15 (FIGS. 2 and 3) is loaded consists of two transmission line impedances in parallel for an impedance of $Z_L/2$. However, the line driver 29 includes two balanced, current source drivers or transistors 71 and 73 (FIG. 4). Each of the transistors 71 and 73 provides the current required for one direction of the transmission line 11. So the impedance at the collector of transistor T1 is equal to $Z_L$. Thus the voltage $V_c$ on the collector of T1 is $$V_c = -\frac{Z_L \cdot V_i}{Re} \quad (3)$$

RECEIVE ONLY OPERATION

When the station 9 is neither transmitting nor receiving, $V_i=0$ and therefore $V_c=0$. However, when the station 9 is not transmitting but is receiving from the transmission line 11 a signal $V_r$ transmitted from a remote station, this received signal $V_r$ will appear unattenuated at the collector of T1 because of the very high impedance of this type of circuit. Thus, in this receive only operation the collector voltage $V_c$ at the collector of T1 is $$V_c = V_r \quad (4)$$

COLLISION

As stated before, when the local station 9 and a remote station both start transmitting simultaneously or substantially simultaneously, a collision occurs. When a collision occurs, the sum of both the received remote station signal ($V_r$) and the transmission $$-\frac{Z_L \cdot V_i}{Re}$$

of the local station 9 will be present at the collector of T1. Thus, in this case the voltage $V_c$ at the collector of T1 will be $$V_c = -\frac{Z_L \cdot V_i}{Re} + V_r \quad (5)$$

FIG. 5B shows a modification of the circuit of FIG. 5A by the addition of serially connected capacitors C1 and C2 coupled across the collector-emitter region of the transistor T1. Capacitors C1 and C2 represent the subtractor 43 of FIG. 3. The output signal $V_u$ of the circuit of FIG. 5B, which is taken from the junction of capacitors C1 and C2, corresponds to the output signal from the adjustment circuit 35 (FIGS. 3 and 4).

The signal at the collector of T1 appears at the output as a component of the output signal $V_u$ and is attenuated by a factor determined by the ratio of the capacitances of C1 and C2. It will be recalled that during a collision the sum of the local transmitted signal and the received signal $V_r$ is present on the collector of T1 as $V_c$. Also the emitter signal $V_e$ of T1 appears at the output as another component of $V_u$ and is also attenuated by a factor determined by the ratio of the capacitances of C1 and C2. Because the signal $V_e$ is 180 degrees out of phase with the transmitted signal at the collector of T1, the crosstalk signal is cancelled and only the received signal $V_r$ remains in the output signal $V_u$ of the adjustment circuit 35.

The cancellation of the crosstalk will now be explained mathematically. The output signal $V_u$ of the adjustment circuit 35 is given by:

$$V_u = \frac{(1/jwC2) \cdot V_c}{1/jwC2 + 1/jwC1} + \frac{(1/jwC1) \cdot V_e}{1/jwC2 + 1/jwC1} \quad (6)$$

where $V_c$ is the signal voltage at the collector of T1 and $V_e$ is the signal voltage at the emitter of T1.

Equation (6) can be rewritten as $$V_u = \frac{C1}{C1 + C2} \cdot V_c + \frac{C2}{C1 + C2} \cdot V_e \quad (7)$$

Substituting equation (5) into equation (6) and setting $V_e = V_i$ results in:

$$V_u = \left(\frac{C1}{C1 + C2}\right) \cdot \left(\frac{-Z_L \cdot V_i}{Re} + V_r\right) + \left(\frac{C2}{C1 + C2}\right) \cdot V_i \quad (8)$$

And if the following condition holds $$\frac{C1}{C1 + C2} \cdot \left(\frac{-Z_L \cdot V_i}{Re}\right) + \frac{C2}{C1 + C2} \cdot V_i = 0 \quad (9)$$

then substituting equation (9) into equation (8) results in:

$$V_u = \frac{C1}{C1 + C2} \cdot V_r$$

$$= \alpha V_r$$

where $\alpha = \frac{C1}{C1 + C2}$

Thus, with a correct choice of C1 and C2, the crosstalk signal is cancelled and only the receive signal $V_r$, attenuated by a factor $\alpha$, remains in the output signal $V_u$.

In equation (9) only four different components appear, namely C1, C2, $R_e$ and $Z_L$. The first three (C1, C2 and $R_e$) can be selected with a high degree of accuracy, but the line impedance $Z_L$ of the transmission line 11 (FIG. 1) may vary over a wide range of, for example, 70 to 110 ohms. The hybrid adjustment of the adjustment circuit 35 for these impedances can be achieved by adjusting either or both of the capacitors C1 and C2.

In the preferred embodiment of the adjustment circuit 35, only C2 is chosen to be adjusted because this minimizes the variation in load of the transmission line 11 (FIG. 1). A preferred form of a variable capacitor is the well-known varactor or varactor diode. The capacitance of a varactor can be readily adjusted by varying the D.C. voltage across the varactor. It will be recalled that, in the preferred embodiment of the adjustment circuit 35 in FIG. 4, two varactors 91 and 93 were used and that these were oppositely poled varactors which were respectively driven by two control signals $V_{C1}$ and $V_{C2}$ that were 180 degrees out of phase with each other. Such an arrangement of varactors has the following advantages.

1. The capacitances of the varactors depends upon the voltages across them. This means that a large A.C. voltage on these varactors will result in a distorted signal due to the non-linear characteristics of the varactors. Using two varactors coupled together with opposite polarity (in antiparallel) results in distortion in both varactors having opposite polarity such that the distortion is almost completely eliminated.

2. Changing the control voltage of one of the varactors introduces noise in the received signal. The use of two varactors coupled together with opposite polarity and two control signals with opposite polarity has the advantage that the noise generated in the received signal by both control signals has an opposite polarity for both of the control signals and is therefore eliminated in the signal $V_u$ at the output of the adjustment circuit 35.

Referring now to FIG. 5C, there is shown a simplified modification of the circuit of FIG. 5B to provide an adjustment circuit 35 which can be automatically adjusted by varying the control signals $V_{C1}$ and $V_{C2}$. Note that C1 in FIGS. 5B and 5C is the same as capacitor 99 in FIG. 4 and that capacitor C2 in FIG. 5B has been replaced in FIG. 5C with the varactors 91 and 93, capacitors 95 and 101, resistors 105, 107 and 109, and output terminal 97 (found in FIG. 4) to form the adjustment circuit 35 shown in FIG. 4. To automatically adjust the adjustment circuit 35 of FIG. 5C, a circuit is implemented to automatically vary the control voltages $V_{C1}$ and $V_{C2}$ of the varactors 91 and 93 such that the crosstalk introduced from the line 33 of FIG. 1 or lines 33A and 33B of FIG. 4 to the output terminal 97 is minimized.

Rewriting equation (8) results in $$V_u = \frac{C2 - (Z_L/R_e) \cdot C1}{C1 + C2} \cdot V_i + \frac{C1}{C1 + C2} \cdot V_r \quad (10)$$

In equation (10) assume that the receive signal $V_r$ is zero ($V_r=0$) and the transmit signal $V_i$ is non-zero. If the adjustment circuit 35 (FIG. 3) is unbalanced and no signal is received ($V_r=0$), the polarity of the output signal $V_u$ relative to $V_i$ indicates in what direction the capacitance C2 has to be adjusted to cancel out $V_i$ from the signal $V_u$. If C2 is too large, $V_u$ and $V_i$ have the same polarity. Otherwise, they have opposite polarities.

The control voltages $V_{C1}$ on line 37A and $V_{C2}$ on line 37B for the varactors 91 and 93, respectively, are derived from the integrator 39 (FIG. 3). As discussed before and shown in FIG. 3, the integrator 39 is implemented with a digital counter 55, a digital-to-analog converter 57 and further includes a phase shifting circuit (not shown) for developing the opposite phase control signals $V_{C1}$ and $V_{C2}$. If, in Equation (10), the capacitance C2 is too large, the transmitted signal $V_i$ and the output signal $V_u$ have the same polarity. The capacitance C2 (or the capacitances of the varactors 91 and 93 that replace C2) must be decreased and the control voltages $V_{C1}$ and $V_{C2}$ for the varactors 91 and 93 must both be increased (since the capacitance of a varactor is inversely proportional to the control voltage). When $V_{C1}$ is increasing in amplitude in one polarity, $V_{C2}$ is increasing in amplitude in the opposite polarity, and vice versa, since they have opposite polarities. As shown in FIG. 4, the voltage across the varactor 91 increases because the anode of varactor 91 is connected to ground via the resistor 87 while the increasing $V_{C1}$ voltage is applied to the cathode of varactor 91; and, similarly, the voltage across the varactor 93 increases because the cathode of varactor 93 is connected to the +5 volt source 93 via the resistor 105 while the decreasing $V_{C2}$ voltage is applied to the anode of varactor 93. Thus, the voltage across both of the varactors 91 and 93 increases.

The control voltage $V_{C1}$ increases if the count of the up/down counter 55 is decreased. Thus, if the transmit signal $V_i$ and the output signal $V_u$ have the same logical states, the counter 55 must count down. This operation is implemented in FIG. 3 by comparing the digitized forms of $V_u$ and $V_i$ in the EXCLUSIVE-OR gate 49. If $V_u$ and $V_i$ have the same logical states, the EXCLUSIVE-OR gate 49 applies a 0 state signal to the counter 55, and vice versa. As stated before, a 0 state output of the gate 49 causes the counter 55 to decrement its count while a 1 state output of the gate 49 causes the counter 55 to increment its count.

As described before, the function of the adjustment circuit 35 is to enable the detection of a received signal from a remote station while the local station 9 itself is transmitting. This function can only be performed when the adjustment circuit 35 is properly adjusted for crosstalk cancellation and is also in a stable condition. Under these conditions the transmit signal is subtracted from the composite signal (sum of the transmitted and received signals) on the line 33 of FIG. 3 or line 33A of FIG. 4 so that only the receive signal remains at the $V_u$ output 97 of the adjustment circuit 35.

Adjusting of the adjustment circuit 35 is performed on the first transmission of the station. However, after the initial power-up of the local station 9, the adjustment circuit 35 is not properly adjusted. As a consequence, crosstalk will result at the output of the adjustment circuit 35, causing the level detector circuit 51 (FIG. 3) to develop an erroneous carrier/collision signal. Normally, since the station 9 is transmitting, the station controller 17 (FIG. 2) would interpret this carrier/collision signal as a collision. However, after initial power-up the adjustment circuit 35 needs some time to be adaptively adjusted. To avoid such an erroneous collision after initial power-up, the controller 17 (FIG. 2) ignores the collision signal during, for example, the first 128 bits of a transmission when the adaptive hybrid 23 (FIG. 2) is in its training period or mode. If no remote station is transmitting onto the transmission line 11, the exemplary 128 bit training period will be sufficient for the adaptive hybrid 23 to adjust itself, as described before, so that the output of the adjustment circuit is substantially zero. In such a case the system of FIG. 3 will be in its normal operation and the $V_r$ term in equation (10) is zero.

If another station is transmitting, then the adjustment of the adjustment circuit 35 will not be completed within the exemplary first 128 bits of transmission after initial power-up. After that exemplary 128 bit training period, there will still be a significant signal present at the output of the adjustment circuit 35, which signal will be detected by the level detector circuit 51 as a carrier/collision signal. In this case, the station controller 17 (FIG. 2) will interpret the carrier/collision signal as a collision, abort the transmission and re-try another transmission after a random time period.

If the adjustment of the adjustment circuit 35 during the initial training period is successful, the adaptive hybrid 23 then operates in its normal operation mode. In this normal operation mode the output of the adjustment circuit 35 will always be below the detection level of the level detector circuit 51 (FIG. 3), except in the case of noise on the line 11 when data is also being received. During each transmission of the local station 9, the adaptive hybrid 23 will continue to adaptively adjust itself to compensate for any changes in component values in the adaptive hybrid 23 and any change in the impedance of the transmission line 11 (FIGS. 1 through 4) due to temperature changes or other effects.

If during normal operation the adjustment circuit 35 develops an output signal, one of the following two situations has occurred.

If the station 9 is not transmitting, then the output signal from the adjustment circuit 35 is either a noise spike or a received signal transmitted from a remote station. If the signal from the adjustment circuit 35 is of sufficient amplitude and duration, the signal will be passed by amplifier 45, detected as a carrier/collision signal by the detector circuit 51 (FIG. 3) and interpreted by the station controller 17 (FIG. 2) as a carrier detect. In this case normal data reception begins.

If the station 9 is transmitting, then the output of the adjustment circuit 35 will subsequently cause the level detector circuit 51 to develop a carrier/collision signal which will be interpreted by the controller 17 as a collision. In this case, the controller 17 removes the adjust enable signal to the up/down counter 55 in integrator 39 (FIG. 3). The counter 55 then stops counting, thereby preventing an undesirable adjustment of the adjustment circuit 35 during a collision. In such a collision, as stated before, the transmission from station 9 is aborted.

Thus, as can be readily seen from the above-described operation, the adjustment of the adjustment circuit 35 occurs when only local station 9 is transmitting. Between two transmissions of the station 9, the adaptive hybrid 23 is latched and remains in a fixed position when the adjust enable signal is removed from the counter 55 in the integrator 39 (FIG. 3). Upon the next transmission during a non-collision mode, the adjust enable signal from the controller 17 (FIG. 2) enables the counter 55 to count, thereby enabling the adaptive hybrid 23 to adaptively adjust itself to minimize any crosstalk at the output of the adjustment circuit 35.

The invention thus provides a system and method for minimizing the crosstalk from a transmitter to a receiver by adaptively forcing to zero the correlation between the output of the transmitter and the output of an adaptive hybrid coupled between the transmitter and receiver.

While the salient features of the invention have been illustrated and described, it should be readily apparent to those skilled in the art that many changes and modifications can be made in the system and method of the invention presented without departing from the spirit and true scope of the invention. Accordingly, the present invention should be considered as encompassing all such changes and modifications of the invention that fall within the broad scope of the invention as defined by the appended claims.

I claim:

1. An adaptive hybrid circuit coupled to a transmission line and between a transmitter and a receiver of a local station for adaptively cancelling a crosstalk component from said transmitter to said receiver, said adaptive hybrid circuit comprising:
   means for comparing an output signal from said receiver with a transmitter signal to be transmitted by said transmitter to develop a first control signal which varies in amplitude as a function of the comparison of said output signal with said signal to be transmitted; and
   adjustment means responsive to said control signal, said transmitter signal and a composite signal from said transmission line containing said crosstalk component from said transmitter and a received signal compnent for generating an estimate of said crosstalk component and combining the estimate with the composite signal to apply to said receiver a residual signal representing the received signal component.

2. The adaptive hybrid circuit of claim 1 wherein said comparing means develops a second control signal in antiphase with said first control signal and wherein said adjustment means includes:
   first and second oppositely poled varactor diodes selectively coupled between said transmitter and said receiver and being individually responsive to said transmitter signal and respectively responsive to said first and second control signals for collectively developing an estimate of the crosstalk component from said transmitter; and
   means for combining said estimate of said crosstalk component with said composite signal to develop and apply said residual signal to said receiver.

3. The adaptive hybrid circuit of claim 1 wherein said comparing means develops a second control signal in antiphase with said first control signal, wherein said transmitter includes a transistor having a base for receiving said transmitter signal, a collector coupled to said transmission line for applying an amplified transmitter signal to said transmission line and an emitter for developing a first signal representative of said transmitter signal but opposite in phase from said amplified transmitter signal, and wherein said adjustment means includes:
   a first varactor diode having an anode coupled to said emitter and a cathode coupled to said receiver;
   a second varactor diode having a cathode coupled to said emitter and an anode coupled to said receiver, said first and second varactor diodes being individually responsive to said transmitter signal and respectively responsive to said first and second control signals for changing their respective capacitances as a function of the amplitudes and polarities of said first and second control signals in order to collectively develop an estimate of the crosstalk component from said transmitter; and
   means for combining said estimate of said crosstalk component with said composite signal to develop and apply said residual signal to said receiver.

4. The adaptive hybrid circuit of claim 1 wherein said comparing means develops a second control signal in antiphase with said first control signal and wherein said adjustment means includes:
   a first varactor diode responsive to said first control signal and said transmitter signal for developing a first estimate of said crosstalk component;
   a second varactor diode responsive to said second control signal and said transmitter signal for developing a second estimate of said crosstalk component; and
   means for selectively combining said first and second estimates of said crosstalk component with said composite signal to develop and apply said residual signal to said receiver.

5. The adaptive hybrid circuit of claim 1 further including:
   a transformer having a first winding coupled to said transmission line and a second winding coupled to said transmitter and to said adjustment means, said transformer operating to apply an output transmit signal from said transmitter to said transmission line, to receive from said transmission line any received signal on said transmission line, to apply only said received signal to said adjustment means when said transmitter is not transmitting and to apply said composite signal to said adjustment means when said transmitter is transmitting at the same time that received signals are received from said transmission line.

6. The adaptive hybrid circuit of claim 1 wherein said adjustment means includes:
  means for multiplying said transmitter signal by said control signal to develop an estimate of said crosstalk component; and
  means for combining said estimate of said crosstalk component with said composite signal to develop and apply said residual signal to said receiver.

7. The adaptive hybrid circuit of claim 1 wherein said comparing means includes:
  a comparator for comparing the output signal from said receiver with said signal to be transmitted to develop a comparison signal having a first or second logical state; and
  an integrator responsive to said comparison signal for counting a sequence of timing signals in a up or down direction as a function of the logical state of said comparison signal in order to generate said first control signal.

8. The adaptive hybrid circuit of claim 7 wherein:
  said comparator is an EXCLUSIVE-OR gate; and
  said integrator includes an up/down counter for counting the sequence of timing signals up or down as a function of the logical state of said comparison signal in order to develop a digital count, and a digital-to-analog converter for developing said control signal.

9. The adaptive hybrid circuit of claim 7 wherein said adjustment means includes:
  means for multiplying said transmitter signal by said control signal to develop an estimate of said cross talk component; and
  means for combining said estimate of said cross talk component with said composite signal to develop and apply said residual signal to said receiver.

10. The adaptive hybrid circuit of claim 7 wherein said comparing means further includes means coupled to said integrator being responsive to said first control signal for developing a second control signal in antiphase with said first control signal and wherein said adjustment means includes:
  first and second oppositely poled varactor diodes selectively coupled between said transmitter and said receiver and being individually responsive to said transmitter signal and respectively responsive to said first and second control signals for collectively developing an estimate of the crosstalk component from said transmitter; and
  means for combining said estimate of said crosstalk component with said composite signal to develop and apply said residual signal to said receiver.

11. The adaptive hybrid circuit of claim 7 wherein said comparing means further includes means coupled to said integrator being responsive to said first control signal for developing a second control signal in antiphase with said first control signal, wherein said transmitter includes a transistor having a base for receiving said transmitter signal, a collector coupled to said transmission line for applying an amplified transmitter signal to said transmission line and an emitter for developing a first signal representative of said transmitter signal but opposite in phase from said amplified transmitter signal, and wherein said adjustment means includes:
  a first varactor diode having an anode coupled to said emitter and a cathode coupled to said receiver;
  a second varactor diode having a cathode coupled to said emitter and an anode coupled to said receiver, said first and second varactor diodes being individually responsive to said transmitter signal and respectively responsive to said first and second control signals for changing their respective capacitances as a function of the amplitudes and polarities of said first and second control signals in order to collectively develop an estimate of the crosstalk component from said transmitter; and
  means for combining said estimate of said crosstalk component with said composite signal to develop and apply said residual signal to said receiver.

12. The adaptive hybrid circuit of claim 7 wherein said comparing means further includes means coupled to said integrator being responsive to said first control signal for developing a second control signal in antiphase with said first control signal and wherein said adjustment means includes:
  a first varactor diode responsive to said first control signal and said transmitter signal for developing a first estimate of said crosstalk component;
  a second varactor diode responsive to said second control signal and said transmitter signal for developing a second estimate of said crosstalk component; and
  means for selectively combining said first and second estimates of said crosstalk component with said composite signal to develop and apply said residual signal to said receiver.

13. In a data communication network including a serial bus and a plurality of transceivers coupled to the serial bus for two-way transmission therebetween, a plurality of adaptive hybrid circuits respectively associated with the plurality of transceivers, each adaptive hybrid circuit comprising:
  means responsive to a transmit signal from the associated transceiver for generating an output transmit signal;
  means coupled to said generating means for applying the output transmit signal to the serial bus and for receiving from the serial bus any receive signal transmitted from a remote transceiver;
  adaptive means coupled across said generating means being responsive to any transmit and receive signals for developing an error signal;
  means coupled to said adaptive means for producing an output receive signal;
  means coupled to said signal producing means for comparing an output receive signal with a transmit signal to provide a comparison signal; and
  means responsive to the comparison signal for causing said adaptive means to produce an error signal in which the output transmit signal is substantially cancelled out.

14. A method for canceling a crosstalk component between a transmitter and a receiver generating an output signal, said method comprising the steps of:
  comparing the output signal from the receiver with a signal to be transmitted to develop a comparison signal having a first or second logical state;
  integrating a sequence of timing signals by counting the timing signals as a function of the logical state of the comparison signal to generate a control signal;
  adaptively using the control signal, a signal representative of the transmitted signal and a composite signal containing a received signal component and a crosstalk component from said transmitter to generate an estimate of the crosstalk component; and combining the estimate of the crosstalk component with the composite signal to apply to the receiver a residual signal representative of only the received signal component.

15. The method of claim 14 wherein said using step includes the step of:
multiplying the signal representative of the transmitted signal by the control signal to develop an estimate of the crosstalk component.

* * * * *